United States Patent Office 3,458,486
Patented July 29, 1969

3,458,486
PRODUCTION OF POLYMERS FROM
CYCLIC COMPOUNDS
Gardner C. Ray and David A. Frey, Bartlesville, Okla., assignors to Phillips Petroleum Company, a corporation of Delaware
No Drawing. Filed Sept. 4, 1964, Ser. No. 394,602
Int. Cl. C08g 23/20, 23/00
U.S. Cl. 260—79.1          13 Claims

ABSTRACT OF THE DISCLOSURE

A high molecular weight polymer produced by reacting sulfur with a polymer prepared by reacting at least one polyhalo-substituted cyclic compound with an alkali metal sulfide in a polar organic compound.

---

This invention relates to the production of polymers from cyclic compounds. In one of its aspects, it relates to the treatment of a polymer from a reaction product of at least one polyhalo-substituted cyclic compound with an alkali metal sulfide in a reaction medium comprising polar organic compound by reacting the same with sulfur. In another of its aspects, the invention relates to increasing the molecular weight of arylene sulfide polymers by the reaction of the same with sulfur. In a still further aspect, the invention relates to the production of a high molecular weight sulfur-containing polymer which can be molded and which posses high temperature stability. In a still further aspect of the invention, a polymer, formed by the reaction of at least one polyhalo-substituted cyclic compound with an alkali metal sulfide in a polar organic compound reaction medium, is intimately mixed with finely divided sulfur in a non-solvent for the two reactants, the non-solvent is removed, and the remaining mixture heated to form a product.

In copending application, Ser. No. 327,143, filed Nov. 27, 1963 by James T. Edmonds, Jr., and Harold Wayne Hill, Jr., now Patent No. 3,354,129, there are described and claimed the polymers which can form the starting material for the present invention. Also claimed in said copending application is a method for preparing said polymers.

In the aforementioned application it is disclosed that sulfur-containing polymers can be prepared in high yield by reacting at least one polyhalo-substituted cyclic compound containing unsaturation between adjacent ring atoms and wherein the halogen atoms are attached to ring carbon atoms with an alkali metal sulfide in a polar organic compound at an elevated temperature. We have now found that the molecular weight of these polymers can be increased by heating these products in the presence of sulfur.

It is an object of this invention to produce a novel polymer. It is a further object of this invention to increase the molecular weight of an arylene sulfide polymer. It is a further object of this invention to provide a method for producing a polymer of increased molecular weight from a polymeric reaction product of an alkali metal sulfide with at least one polyhalo-substituted cyclic compound containing unsaturation between adjacent ring atoms, wherein the halogen atoms are attached to ring carbon atoms, in a polar organic compound at an elevated temperature. It is a still further object of this invention to produce sulfur-containing polymers which can be molded and which have stability at high temperatures.

Other aspects, objects, and the several advantages of this invention are apparent from a study of this disclosure and the appended claims.

According to the present invention, the molecular weight of arylene sulfide polymers is increased by reacting the same with a small amount of sulfur. According to the process of this invention, the molecular weight of sulfur-containing polymeric products obtained by the reaction of polyhalo-substituted aromatic compound or polyhalo-substituted heterocyclic compound with an alkali metal sulfide in a polar organic solvent can be increased by heating said polymeric products in the presence of a minor amount of sulfur.

The process of the invention is carried out by forming a homogenous dispersion of at least one of the above defined polymeric products and finely divided sulfur. Formation of the dispersion can be carried out in any suitable manner, including dry mixing, grinding the ingredients together, or mixing in the presence of a dispersing medium which is a non-solvent for the polymer and sulfur. When employing a dispersing medium, the slurry of polymer and sulfur in a dispersing medium is agitated to form a homogeneous mixture in a manner so as to minimize evaporation of the dispersing medium during mixing. Formation of the mixture and subsequent separation of the dispersing agent, if used, is normally carried out at temperatures below the melting point of sulfur. Following formation of the mixture, the dispersing medium, if used, can be separated by such methods as filtration, decantation and the like.

Suitable non-solvent liquids include methanol, ethanol, isopropanol, water, hydrocarbons, such as benzene, toluene, cyclohexane, normal heptane, and the like, including mixtures of two or more of such solvents.

In the process of this invention, the mixture is heated to a temperature which is at least above the melting point of the chosen polymeric product. This temperature generally will be in the range of from about 100° C. to about 450° C., and preferably the range will be from about 300° C. to about 375° C. The time during which the mixture is held at such a temperature will range from a few minutes to several days, and usually from about 1 to 24 hours with the longer times being used at lower temperatures and vice versa. The preferred time for a poly(phenylene sulfide), for example, is 3 hours to 6 hours in a temperature range from 300° C. to 375° C.

The amount of sulfur present in the mixture of sulfur and polymer according to the invention will be generally in the range of from about 2 parts to about 10 parts of sulfur per 100 parts polymer. The amount of sulfur used will depend mainly upon the chosen polymeric product and the increase in molecular weight desired, and upon other variables selected by one skilled in the art. When increasing the weight of poly(phenylene sulfide), about five parts of sulfur per 100 parts of polymer are usually preferred.

In anoter embodiment of the invention a molded product can be made directly by heating a homogeneous mixture of the polymer and sulfur in a mold which has the shape of the desired product. This method is useful when the desired product is of such high molecular weight that it is difficult to melt.

The polyhalo-substituted compounds which can be employed as primary reactants for the polymeric product are represented by the formulas:

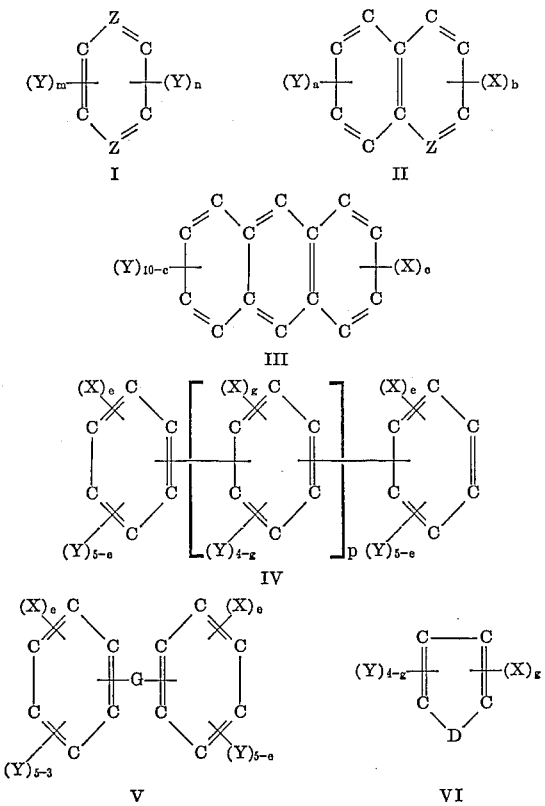

wherein each X is a halogen selected from the group consisting of chlorine, bromine, iodine, and fluorine, preferably chlorine and bromine, each Y is selected from the group consisting of hydrogen,

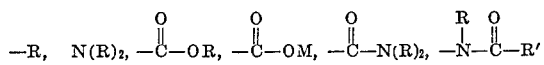

wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

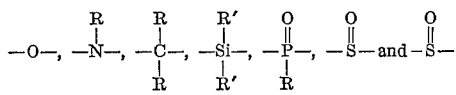

M is an alkali metal selected from the group consisting of sodium, potassium, lithium, rubidium, and cesium; $n$ is a whole integer of from 2 to 6, inclusive; when both Z's is Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds.

Some specific examples of polyhalo-substituted aromatic compounds and polyhalo-substituted heterocyclic compounds of the above general formulas which are reacted with alkali metal sulfides to produce the polymeric products which are improved according to the process of this invention are:

1,2-dichlorobenzene
1,3-dichlorobenzene
1,4-dichlorobenzene
2,5-dichlorotoluene
1,4-dibromobenzene
1,4-diiodobenzene
1,4-difluorobenzene
2,5-dibromoaniline
N,N-dimethyl-2,5-dibromoaniline
1,3,5-trichlorobenzene
1,2,4,5-tetrabromobenzene
hexachlorobenzene
1-n-butyl-2,5-dichlorobenzene
1-cyclohexyl-2,5-diiodobenzene
1-isooctyl-2,4-difluorobenzene
1-n-dodoecyl-2,5-dichlorobenzene
1-benzyl-2,5-dibromobenzene
1,4-di-n-butyl-2,5-dichlorobenzene
1,4-di-n-nonyl-2,6-di-bromobenzene
1,3,5-trichloro-2,4,6-triphenylbenzene
1,4-dibromo-2,3,5,6-tetra(4-ethylphenyl)benzene
methyl 2,5-dichlorobenzoate
isopropyl 2,3,5-tribromobenzoate
cyclohexyl 2,4,6-triiodobenzoate
phenyl 2,3,4,5,6-pentachlorobenzoate
2,5-dichlorobenzamide
N,N-di-n-dodecyl-2,4,5-tribromobenzamide
ethyl 2,4,5-trichloroacetanilide
cylohexyl N-methyl-2,5-dibromoacetanilide
1,4-dibromonaphthalene
1,4-dichloro-7,8-diethylnaphthalene
1-methoxy-2,5-dichlorobenzene
1-cyclohexylthio-2,5-dichlorobenzene
1,4,7,8-tetrabromo-2,3,5,6-tetra-n-butylnaphthalene
1,3,5-trichloro-7-aminonaphthalene
n-octyl 2,4-dibromo-naphthalene-1-carboxylate
N,N-dimethyl-5,6,7,8-tetrabromo-1-naphthalene-carboxamide
1-acetamido-2,4-dibromonaphthalene
8-decoxyl-1,4-difluoronaphthalene
6,7-dibenzyl-8-methylthio-1,4-dichloronaphthalene
1,4-dichloroanthracene
1,7-dibromo-6-cyclohexylanthracene
2,8-diiodo-3,7-diethylanthracene
1-dodecyl-2,6-difluoroanthracene
1,2,4-trichloro-6-carbethoxyanthracene
2,6-dibromo-8-aminoanthracene
3,7-diiodo-4-cyclohexylthioanthracene
n-decyl 3,8-difluoroanthracene carboxylate
1-acetamido-2,4-dibromoanthracene
10-dodecoxy-1,3,5-trichloroanthracene
4,4'-dichlorobiphenyl
3,4'-dibromo-2-aminobiphenyl
2,2',4-tribromo-6-acetamidobiphenyl
3,3'-dichloro-4,4'-didodecylbiphenyl
4,4'-diiodo-3-ethoxy-6-n-octylbiphenyl
2,2',4,4'-tetrabromo-6-N,N-dimethylaminobiphenyl
4,4'-dichloro-3,3'-dicyclohexylbiphenyl
4,4''-dibromo-p-terphenyl
3,3'-3''-trichloro-p-terphenyl
4,4''-dichloro-3'-acetamido-p-terphenyl
4,4''-difluoro-2,2',2''-tri-n-decyl-3'-methoxy-p-terphenyl
4,4''-dibromo-3'-carbbutoxy-p-terphenyl
4,4''-dichloro-2-(N-acetylamino)-p-terphenyl
3,4-dibromothiophene
3,4-dichlorofuran
3,4-difluoropyrrole 2,5-dibromo-4-aminothiophene
2,5-dichloro-3-ethoxythiophene
3,4-difluoro-5-acetamidofuran
3,4-dibromo-5-carbethoxypyrrole
2,5-dichloropyridine
3,5-dibromo-4-methylpyridine
4,8-diiodoquinoline
2,3,6,7-tetrachloro-4,5-di-n-butylquinoline
1,4-dibromo-2,3,5,6-tetrafluorobenzene
4-chlorobromobenzene
2,5-dichlorobenzene-sulfonic acid
sodium 2,5-dibromobenzenesulfonate
2,8-difluoronaphthalenecarboxylic acid
lithium 2,7-diiodoanthracenecarboxylate
p,p'-dichlorodiphenyl ether
o,p'-dibromodiphenylamine
2,4'-difluorodiphenylmethane
3,3'-dichlorodiphenyl dimethylsilane
di(2-methyl-4-bromophenyl) sulfoxide
methyl di(3-ethyl-4-chlorophenyl) phosphite
4-bromophenyl 3-n-butyl-4-chlorophenyl sulfone
2,6-dichloropyrazine It is to be understood that the polymeric reactants according to the invention are intended to include homopolymers obtained by the reaction of one of the above described compounds with an alkali metal sulfide as well as copolymers and/or terpolymers, etc. obtained when mixtures of two or more of the above compounds are reacted with an alkali metal sulfide.

The alkali metal sulfides which are reacted with the above described compounds to form a reactant of the process are represented by the formula $M_2S$ (M as defined above), and includes monosulfides of sodium, potassium, lithium, rubidium, and cesium, including the anhydrous and hydrated forms of these sulfides. These alkali metal sulfides can be charged per se, or they can be formed in situ by reaction of an alkali metal hydroxide with $H_2S$ at a mol ratio of alkali metal hydroxide/$H_2S$ of about 2/1.

Polar organic compounds which are employed in the reaction to make the polymeric reactants of the invention should be a solvent for the polyhalosubstituted aromatic compounds or polyhalosubstituted heterocyclic compounds and the alkali metal sulfide. Examples of suitable solvents include amides, lactams, sulfones and the like. Specific examples of such compounds are N-methylpyrrolidone, pyrrolidone, caprolactam, N-ethylcaprolactam, sulfolane, dimethylacetamide, hexamethylphosphoramide, tetramethylurea, N,N'-ethylene dipyrrolidone, and dimethyl formamide.

The polymers of increased molecular weight produced by the process of this invention can be molded into a variety of useful articles by molding techniques which are well known in the art. Molding should be carried out above the melting point or the softening point, but below the decomposition point of the particular polymer being molded. Suitable molding techniques include injection molding, compression molding, vacuum forming, extrusion and the like. Non-meltable polymers can be fabricated by means of a binder or by a sintering technique using powder molding as is used in powder metallurgy.

The following specific example is intended to illustrate the advantage of the process of this invention.

Example I

A series of runs was carried out in which poly(phenylene sulfide), prepared by the reaction of sodium sulfide with p-dichlorobenzene in N-methylpyrrolidone, was heated with sulfur according to the process of this invention to increase the molecular weight.

In these runs, 25 grams of the poly(phenylene sulfide) and the desired amount of sulfur were charged to a 16 ounce wide mouth bottle along with 100 ml. of methanol. Five steel balls were then placed in the bottle and the bottle sealed. The bottle and contents were then rotated on a mill for 18 hours to obtain a rolling action of the ball and the ingredients. It was also determined that the milling of the slurry could be carried out in a Waring Blendor.

Following the forming of the homogeneous mixture, the methanol was removed by filtration, and the mixture was dried by evaporation in a vacuum oven. The remaining homogeneous mixture of sulfur and poly(phenylene sulfide) was then heated to a temperature above 300° C. for from 2 to 15 hours under a $N_2$ atmosphere. The polymer was then removed and the increase in molecular weight was determined by measurement of low shear viscosity. The results of these runs are expressed below in the table. In the table, the poly(phenylene sulfide) used in the first five runs was prepared by the reaction of p-dichlorobenzene with sodium sulfide using a mol ratio of p-dichlorobenzene/$Na_2S$ of 1.1/1. In the remaining runs, the polymer was prepared using a mol ratio of p-dichlorobenzene/$Na_2S$ of 1.05/1. Following the sulfur curing of the polymers in the runs shown in the following table, all of the polymers were molded into films.

TABLE

| Run No. | Mol ratio p-dichlorobenzene/$Na_2S$ during polymer preparation | Pts. sulfur per 100 pts. polymer | Cure temp., °C. | Cure time, hours | Low shear viscosity at 303° C. poises |
|---|---|---|---|---|---|
| 1 | 1.1 | 0 | Not cured | | 88 |
| 2 | 1.1 | 0 | 305 | 4 | 15 |
| 3 | 1.1 | 5 | 305 | 4 | $2.9 \times 10^4$ |
| 4 | 1.1 | 10 | 305 | 4 | $3.1 \times 10^4$ |
| 5 | 1.1 | 20 | 305 | 4 | $7.5 \times 10^2$ |
| 6 | 1.05 | 0 | Not cured | | $1.4 \times 10^2$ |
| 7 | 1.05 | 0 | 305 | 4 | 57 |
| 8 | 1.05 | 5 | 305 | 4 | $2.8 \times 10^4$ |
| 9 | 1.05 | 5 | 305 | 15 | $1.6 \times 10^5$ |
| 10 | 1.05 | 5 | 325 | 2 | $8.9 \times 10^4$ |
| 11 | 1.05 | 5 | 325 | 4 | $1.5 \times 10^5$ |
| 12 | 1.05 | 5 | 340 | 2 | $2.3 \times 10^5$ |
| 13 | 1.05 | 5 | 340 | 4 | $1.5 \times 10^4$ |
| 14 | 1.05 | 5 | 340 | 6 | $7.4 \times 10^5$ |

It can be seen from the foregoing example, that the molecular weight, as determined by the low shear viscosity at 303° C., was increased by the addition of a small amount of sulfur to a poly(Phenylene sulfide) polymer. It will be noted that the shear viscosity reaches a maximum for the poly(phenylene sulfide) polymer at a concentration of about 10 parts of sulfur per 100 parts of polymer and thereafter begins to taper off. Runs No. 1 through 5 show the effect of sulfur addition to the polymer, and runs 6 through 14 show the effect of curing temperature on the low shear viscosity of the polymer.

Reasonable variation and modification are possible within the scope of the foregoing disclosure and the appended claims of this invention, the essence of which is that the polymers prepared by the reaction of at least one polyhalo-substituted cyclic compound with an alkali metal sulfide in a polar organic compound are reacted with a small amount of sulfur at an elevated temperature to produce a high molecular weight polymer.

We claim:

1. A process for the production of a polymer which comprises reacting at a temperature in the range of 100–450° C. a mixture consisting essentially of;
   (a) a polymer produced by a reaction of at least one polyhalo-substituted cyclic compound containing unsaturation between adjacent ring atoms and wherein the halogen atoms are attached to ring carbon atoms with an alkali metal sulfide in a polar organic solvent at an elevated temperature for a time sufficient to obtain said polymer, and
   (b) a small amount of sulfur.

2. The method of claim 1 wherein said polymer is prepared by the reaction of sodium sulfide with p-dichlorobenzene in N-methylpyrrolidone.

3. A method according to claim 2 wherein the polymer and sulfur are dispersed in a dispersing medium which is a non-solvent for said polymer and sulfur, the mixture is homogenized, said dispersing medium is removed, and said polymer and sulfur now homogeneously mixed, are heated to a temperature sufficient to carry out the reaction.

4. A method according to claim 3 wherein the temperature to which said mixture is heated is in the approximate range of 300 to 375° C. and the time during which said mixture is heated is in the approximate range of 3 to 6 hours.

5. A method according to claim 3 wherein said dispersing medium is methanol.

6. A process for the production of a polymer which comprises reacting at a temperature in the range of 100–450° C. a mixture consisting essentially of a small amount of sulfur with the product obtained from the reaction of at least one compound selected from the group consisting of compounds which have the following general formulas:

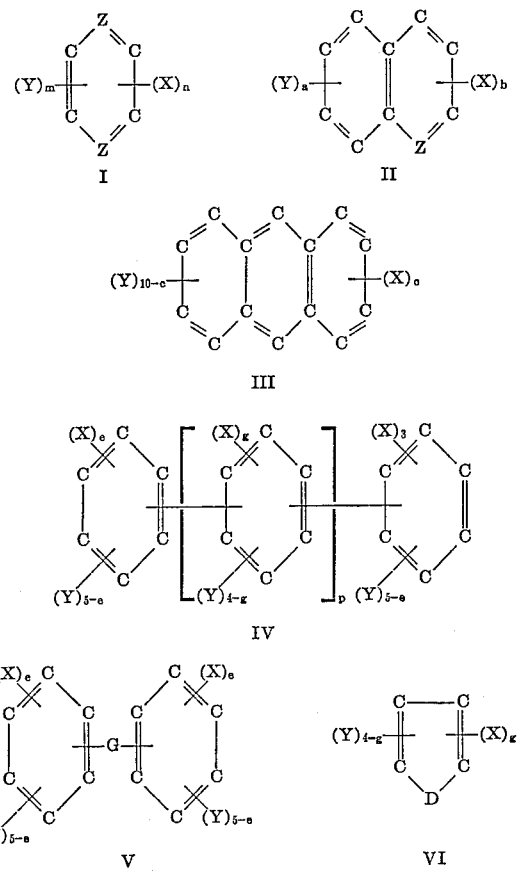

wherein each X is a halogen selected from the group consisting of chlorine, bromine, iodine, and fluorine, preferably chlorine and bromine, each Y is selected from the group consisting of hydrogen,

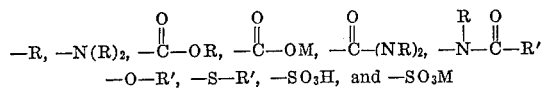

wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S— and

G is selected from the group consisting of

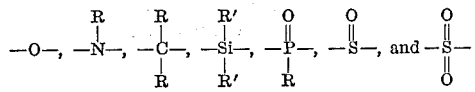

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $$a=8-b$$

when Z in Formula II is —N=, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1, with an alkali metal sulfide in a polar organic solvent.

7. A process according to claim 6 wherein the reaction time is one to twenty-four hours.

8. A polymer formed by heating at a temperature in the range of from 100–450° C. a mixture consisting essentially of:
(a) a polymer produced by the reaction of at least one polyhalo-substituted cyclic compound containing unsaturation between adjacent ring atoms and wherein the halogen atoms are attached to ring carbon atoms with an alkali metal sulfide in a polar organic solvent heated to a temperature for a time sufficient to form said polymer, and
(b) a small amount of sulfur.

9. A polymer according to claim 6 wherein the said small amount of sulfur is present in an amount of 2 to 10 parts sulfur per 100 parts of said polymer.

10. A polymer of claim 8 formed by the reaction of poly(phenylene sulfide) prepared by the reaction of sodium sulfide with p-dichlorobenzene in N-methylpyrrolidone at an elevated temperature, and a small amount of sulfur at an elevated temperature.

11. A polymer according to claim 8 wherein the said poly(phenylene sulfide) is homogeneously mixed with the sulfur by forming a dispersion of said poly(phenylene sulfide) and said sulfur in methanol, agitating said dispersion, and removing said methanol.

12. A polymer according to claim 8 wherein said mixture of poly(phenylene sulfide) and sulfur is heated to a temperature of from 300 to 375° C. for 1 to 24 hours.

13. A process for producing a molded polymer comprising heating at a temperature in the range of from 100–450° C. in a predetermined shaped mold, a homogeneous mixture consisting essentially of :
(a) a polymer formed by the reaction of at least one polyhalo-substituted cyclic compound containing unsaturation between adjacent ring atoms and wherein the halogen atoms are attached to ring carbon atoms with an alkali metal sulfide in a polar organic solvent at an elevated temperature for a time sufficient to form said polymer, and
(b) a small amount of sulfur.

(References on following page)

References Cited

UNITED STATES PATENTS

| | | | |
|---|---|---|---|
| 2,513,188 | 6/1950 | Macallum | 260—79.1 |
| 2,538,941 | 1/1951 | Macallum | 260—79.1 |
| 2,986,582 | 6/1961 | Martin et al. | 260—79.1 |
| 3,099,643 | 7/1963 | Berenbaum et al. | 260—79.1 |
| 3,219,638 | 11/1965 | Warner | 260—79.1 |
| 3,248,325 | 4/1966 | Graham | 260—79.1 |
| 3,268,504 | 8/1966 | Harris et al. | 260—79.1 |

OTHER REFERENCES

Jorczak et al.: "Polysulfide Liquid Polymers" Industrial and Engineering Chemistry, vol. 43, pages 324 to 328. 1951, Scientific Library.

DONALD E. CZAJA, Primary Examiner

M. J. MARQUIS, Assistant Examiner

U.S. Cl. X.R.

252—45; 260—79

UNITED STATES PATENT OFFICE

CERTIFICATE OF CORRECTION

Patent No. 3,458,486     Gardner C. Ray and David A. Frey     Dated July 29, 1969

It is certified that error appears in the above-identified patent and that said Letters Patent are hereby corrected as shown below:

Column 7, line 70, that portion of the formula reading "$-\overset{O}{\overset{\|}{C}}-(NR)_2,$" should read --- $-\overset{O}{\overset{\|}{C}}-N(R)_2,$ ---.

Column 8, lines 54 and 59, "claim 8", each occurrence, should read --- claim 10 ---

SIGNED AND
SEALED
JAN 20 1970

(SEAL)
Attest:

Edward M. Fletcher, Jr.
Attesting Officer

WILLIAM E. SCHUYLER, JR.
Commissioner of Patents